United States Patent Office 2,937,177
Patented May 17, 1960

2,937,177

1-ω-N,N - DISUBSTITUTED AMINOALKYL-4-PHENYL-1,2,3,6 - TETRAHYDROPYRIDINE DERIVATIVES

Frederick L. Bach, Jr., Pearl River, and James R. Vaughan, Jr., New City, N.Y., assignors to American Cyanamid Company, New York, N.Y., a corporation of Maine No Drawing. Application December 26, 1957
Serial No. 705,085

6 Claims. (Cl. 260—268)

This invention relates to new substituted tetrahydropyridines. More particularly, it relates to phenyl alkylene tetrahydropyridines and preparation of the same.

The compounds of the present invention can be illustrated by the following general formula:

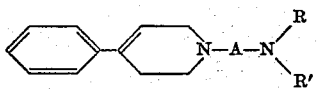

in which A is a saturated hydrocarbon chain containing not more than 10 carbon atoms, R is an aryl radical, R' is a lower alkyl radical, NRR' when taken together form a heterocyclic radical with nitrogen as the hetero atom and acid salts thereof. In the above formula, A can be divalent radicals such as ethylene, propylene, isopropylene, pentamethylene, octamethylene, decamethylene and the like. The radical R can be phenyl or substituted phenyl such as methylphenyl, ethylphenyl, propylphenyl, butylphenyl, etc. The group NRR' can be 1-tetrahydropyridine, 1-tetrahydropyridine-4-phenyl, 1-piperazine-4-carbethoxy and the like.

The organic base compounds of the present invention will form salts with one or two molar equivalents of a mineral acid such as hydrochloric, hydrobromic, sulfuric or phosphoric acid. The organic bases in a solvent such as ether or chloroform when treated with a dry hydrohalogen gas will produce the corresponding salt.

The base compounds are in general solids, although some are viscous oils at room temperature. The salts are crystalline solids with a definite melting point.

The compounds of the present invention which contain the same grouping at each end of the divalent saturated hydrocarbon chain can be prepared, for example, by reacting 4-phenyltetrahydropyridine with an alpha, omega dihaloalkane. The reaction is preferably carried out in an inert organic solvent at refluxing temperatures in the presence of an acid acceptor such as an alkali metal carbonate or bicarbonate.

The present compounds can also be prepared by reacting a compound having the general formula

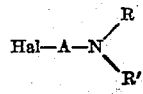

in which A, R and R' are defined as above and Hal is halogen, with phenyltetrahydropyridine with or without the use of a solvent. This process is useful in preparing the unsymmetrical compounds of the present invention.

The compounds of the present invention are useful for their pharmacodynamic properties. They are active as analgesics and sedatives and as hypotensive agents.

The following examples illustrate the preparation of representative compounds of the present invention.

Example 1

To a suspension of 16.8 grams of sodium bicarbonate and 15.9 grams of 4-phenyl-1,2,3,6-tetrahydropyridine in 75 ml. of ethanol is added 10.1 grams of 1,3-dibromopropane. The mixture is refluxed 15 hours and then filtered and concentrated to a brown, semi-solid residue. The residual oil is then made strongly alkaline with concentrated aqueous potassium hydroxide solution and extracted with two 100 ml. portions of chloroform. The chloroform is evaporated to a waxy solid which is recrystallized from an ether-petroleum ether solution. The product 1,1' - propylenebis[1,2,3,6 - tetrahydro-4-phenyl-pyridine] melts at 91° C. to 93° C.

Example 2

Two grams of 1,1'-propylenebis[1,2,3,6-tetrahydro-4-phenyl-pyridine] is heated at steam bath temperature with 50 ml. of concentrated hydrochloric acid for ten hours. On cooling, the dihydrochloride of 1,1'-propylenebis[1,2,3,6-tetrahydro-4-phenyl-pyridine] precipitates as a white crystalline solid; melting point 290° C. to 292° C. (with effervescence).

Example 3

1,8-dibromooctane (6.8 grams) is added to a suspension of 8.0 grams of 4-phenyl-1,2,3,6-tetrahydropyridine and 5.0 grams of sodium bicarbonate in 100 ml. of ethanol. This mixture is refluxed fifteen hours and then filtered, concentrated to a brown, oily residue and made strongly alkaline using 100 ml. of a concentrated aqueous sodium hydroxide solution. The organic material is extracted with two 100 ml. portions of chloroform, and the combined extracts are decolorized with activated charcoal. After drying over 50 grams of anhydrous potassium carbonate, the chloroform is removed at reduced pressure and the residual oil solidifies on standing. This material is recrystallized from benzene to yield 1,1'-octamethylenebis[1,2,3,6-tetrahydro-4-phenyl-pyridine]; melting point 116° C. to 119° C.

Example 4

Five hundred and seventy-seven milligrams of 1,1'-octamethylenebis[1,2,3,6-tetrahydro - 4 - phenylpyridine] are dissolved in 50 ml. of concentrated hydrochloric acid and heated at 80° C. for four hours. When this solution cools, the dihydrochloride of 1,1'-octamethylenebis[1,2,3,6-tetrahydro-4-phenyl-pyridine] is deposited; melting point 282° C. to 284° C. (with sintering at 280° C.)

Example 5

A solution of 7.5 grams of 1,10-dibromodecane and 8.1 grams of 4-phenyl-1,2,3,6-tetrahydropyridine in 100 ml. of ethanol is treated with 5.0 grams of sodium bicarbonate and then refluxed for fifteen hours. After removing the solvent, the residual oil is made strongly alkaline with concentrated aqueous sodium hydroxide and chloroform is used to extract the organic material. The extracts are combined, decolorized with activated charcoal, and dried over anhydrous potassium carbonate for four hours. After filtration, the solvent is removed and 1,1'-decamethylenebis[1,2,3,6-tetrahydro - 4 - phenyl-pyridine] is obtained as a heavy oil which solidifies on standing; melting point 114° C. to 116° C. (with softening at 110° C.).

Example 6

β-(N-ethyl-N-phenylamino)ethyl chloride monohydrochloride (11.0 grams) is condensed with 8.0 grams of 4-phenyl-1,2,3,6-tetrahydropyridine in refluxing ethanol using 10.0 grams of sodium bicarbonate as an acid-acceptor. After refluxing fifteen hours, the solution is cooled to room temperature, filtered and concentrated to a brown oil. This residual material is treated with a concentrated aqueous solution of sodium hydroxide and extracted with chloroform. The combined chloroform extracts are dried over anhydrous potassium carbonate, and then subjected to a fractional distillation. The product 1-[β-(N-ethyl-N-phenylamino)ethyl]-4-phenyl-1,2,3,6-tetrahydro pyridine is obtained which distills at 220° C. to 225° C. at 1.5 mm. pressure.

Example 7

1-[β-(N-ethyl-N-phenylamino)ethyl]-4-phenyl - 1,2,3,6-tetrahydropyridine (11.8 grams) is treated with one molar equivalent of hydrochloric acid in 10 ml. of ethanol. The acidic solution is warmed for five minutes on a steam bath and then refrigerated for ten hours. A crystalline product is deposited from this solution and, after one recrystallization from ethanol, the monohydrochloride of 1-[β-(N-ethyl - N - phenylamino)ethyl]-4-phenyl-1,2,3,6-tetrahydropyridine is obtained; melting point 216° C. to 219° C.

Example 8

1(γ-chloropropyl)-4-carbethoxypiperazine monohydrochloride (13.5 grams) is condensed with 8.0 grams of 4-phenyl-1,2,3,6-tetrahydropyridine in refluxing ethanol (150 mls.) using 10.0 grams of sodium bicarbonate as an acid-acceptor. After refluxing fifteen hours, the reaction mixture is concentrated to a heavy residual oil which is fractionated under reduced pressure. The product 1-[2-(4-carbethoxy-1-piperazinyl)-4 - phenyl-1,2,3,6-tetrahydropyridine is collected as a viscous oil; boiling point 220° C. to 225° C. at 0.7 mm. pressure.

We claim:
1. A compound selected from the group having the general formula:

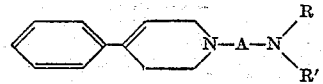

in which A is a saturated hydrocarbon chain containing not more than 10 carbon atoms, R is a phenyl radical, R' is a lower alkyl radical, NRR' when taken together form a heterocyclic radical of the group consisting of tetrahydropyridinyl, phenyltetrahydropyridinyl, piperazinyl, and carbo lower alkoxypiperazinyl; with nitrogen as the heteroatom and therapeutic nontoxic acid addition salts thereof.

2. The compound 1,1'-propylenebis[1,2,3,6-tetrahydro-4-phenyl pyridine].

3. The compound 1[3-(4-carbethoxy-1-piperazinyl)-propyl]-4-phenyl-1,2,3,6-tetrahydropyridine.

4. The compound 1[β-(N-ethyl-N-phenylamino)ethyl]-4-phenyl-1,2,3,6-tetrahydropyridine.

5. The compound 1,1'-octamethylenebis[1,2,3,6-tetrahydro-4-phenyl pyridine].

6. The compound 1,1'-decamethylenebis[1,2,3,6-tetrahydro-4-phenyl pyridine].

References Cited in the file of this patent
UNITED STATES PATENTS
2,750,385    Schmidle et al. _____ June 12, 1956